United States Patent [19]

Fischer et al.

[11] 3,894,916

[45] July 15, 1975

[54] SEPARATION OF 3,3-DIMETHYLACROLEIN AND -METHYL-3-BUTEN-1-OL BY AZEOTROPIC DISTILLATION WITH WATER AND GLYCEROL

[75] Inventors: Roman Fischer, Mutterstadt; Siegfried Maier, Ludwigshafen; Wolfgang Koernig, Mannheim, all of Germany

[73] Assignee: Badische Anilin- & Soda-Fabrik Aktiengesellschaft, Ludwigshafen (Rhine), Germany

[22] Filed: Aug. 29, 1973

[21] Appl. No.: 392,821

[30] Foreign Application Priority Data
Sept. 7, 1972    Germany ..................... 2243810

[52] U.S. Cl. .................. 203/55; 203/64; 260/601 R
[51] Int. Cl. ............................................. B01d 3/34
[58] Field of Search .................... 203/55, 64, 95–97; 260/601 R

[56] References Cited
UNITED STATES PATENTS

| | | | |
|---|---|---|---|
| 2,514,966 | 7/1950 | Pierotte et al. | 203/76 |
| 2,767,216 | 10/1956 | Evans et al. | 260/601 R |
| 2,862,978 | 12/1958 | Skinner et al. | 260/601 R |
| 3,220,932 | 11/1965 | Crandall | 203/55 |

FOREIGN PATENTS OR APPLICATIONS

| | | | |
|---|---|---|---|
| 2,020,865 | 4/1970 | Germany | 260/601 R |

*Primary Examiner*—Norman Yudkoff
*Assistant Examiner*—Frank Sever
*Attorney, Agent, or Firm*—Johnston, Keil, Thompson & Shurtleff

[57] ABSTRACT

A process for separating, by distillation, a mixture consisting essentially of 3,3-dimethylacrolein and 3-methyl-3-buten-1-ol, wherein the mixture to be separated is distilled in the presence of water and glycerol, the 3,3-dimethyl-acrolein first being distilled off azeotropically with water and the 3-methyl-3-buten-1-ol then being separated, as an azeotropic mixture with water, from the higher-boiling glycerol. It is also possible to isolate the 3,3-dimethylacrolein by distillation if the 3-methyl-3-buten-1-ol is partially replaced by 3-methyl-2-buten-1-ol. The 3,3-dimethylacrolein, which can be isolated in pure form by the process of the invention, is a valuable intermediate for the synthesis of natural substances such as citral, vitamin A and chrysanthemic acid.

7 Claims, No Drawings

SEPARATION OF 3,3-DIMETHYLACROLEIN AND -METHYL-3-BUTEN-1-OL BY AZEOTROPIC DISTILLATION WITH WATER AND GLYCEROL

The present invention relates to a process for the separation of a mixture consisting essentially of 3,3-dimethylacrolein and 3-methyl-3-buten-1-ol by distillation in the presence of water and glycerol.

German Published Application No. 2,020,865 discloses the dehydrogenation of 3-methyl-3-buten-1-ol to 3,3-dimethylacrolein using dehydrogenation catalysts. The Examples of this published application show that good yields of 3,3-dimethyl-acrolein are only obtained if the reaction conditions are so chosen that the 3-methyl-3-buten-1-ol is converted only incompletely. Since the boiling points of 3,3-dimethylacrolein and of the unreacted 3-methyl-3-buten-1-ol only differ by 1°C, it is not possible to separate the two compounds quantitatively by simple distillation. Hence, the method hitherto used to isolate 3,3-dimethylacrolein was to dehydrate the unreacted 3-methyl-3-buten-1-ol catalytically to give isoprene, which can be separated from dimethylacrolein by distillation. As a result, the production of pure 3,3-dimethylacrolein is very expensive and also entails substantial losses in yield.

It is therefore an object of the invention to provide a process which makes it possible to separate 3,3-dimethylacrolein completely and without losses from unreacted 3-methyl-3-buten-1-ol.

We have now found that a mixture consisting essentially of 3,3-dimethylacrolein und 3-methyl-3-buten-1-ol can be separated simply, completely and without losses of 3,3-dimethylacrolein, by distillation, if the mixture consisting essentially of 3,3-dimethylacrolein and 3-methyl-3-buten-1-ol is distilled in the presence of 15 to 100, preferably 20 to 40, parts by weight of water and 5 to 30, preferably 8 to 20, parts by weight of glycerol per 100 parts by weight of the mixture of 3,3-dimethylacrolein and 3-methyl-3-buten-1-ol, the 3,3-dimethylacrolein first being distilled off azeotropically with water and the 3-methyl-3-buten-1-ol then being separated, as an azeotropic mixture with water, from the glycerol which has a higher boiling point.

3,3-Dimethylacrolein and 3-methyl-3-buten-1-ol thus form azeotropic mixtures with water, which can, surprisingly, be separated practically quantitatively from one another by adding glycerol to the mixture to be separated. Both azeotropes can, in the gas phase, consist of up to 50 percent by weight of water. In order to ensure that the azeotropes are formed, water is added to the mixture to be separated and the aqueous phases which separate upon condensation of the azeotropes are continuously recycled to the distillation vessel.

If it is intended to separate, according to the invention, mixtures containing 3,3-dimethylacrolein and 3-methyl-3-buten-1-ol which have been obtained by incomplete dehydrogenation of 3-methyl-3-buten-1-ol in the presence of steam, i.e. mixtures which already contain water, it is in many cases unnecessary to add further water at the beginning of the distillation.

If small amounts of low-boiling constituents, such as isovaleraldehyde and isoprene, are still present in the mixture containing 3,3-dimethylacrolein and 3-methyl-3-buten-1-ol, these constituents are removed by simple distillation before the extractive distillation proper in the presence of water and glycerol is carried out.

Incomplete dehydrogenation of 3-methyl-2-buten-1-ol yields a mixture with in addition to 3,3-dimethylacrolein and 3-methyl-3-buten-1-ol contains 3-methyl-2-buten-1-ol. If it is desired to separate this mixture according to the invention, the mixture consisting essentially of 3,3-dimethylacrolein, 3-methyl-3-buten-1-ol and 3-methyl-2-buten-1-ol is also distilled in the presence of 15 to 100, preferably 20 to 40, parts by weight of water and 5 to 30, preferably 8 to 20, parts by weight of glycerol per 100 parts by weight of the mixture of 3,3-dimethylacrolein, 3-methyl-3-buten-1-ol and 3-methyl-2-buten-1-ol, the 3,3-dimethylacrolein first being distilled off azeotropically with water and the 3-methyl-3-buten-1-ol and the 3-methyl-2-buten-1-ol then being separated together, as azeotropic mixtures with water, from the higher-boiling glycerol. The same applies when a mixture consisting essentially of 3,3-dimethylacrolein, 3-methyl-3-buten-1-ol and 3-methyl-2-buten-1-ol which already contains water is used as starting mixture.

The ratio of 3,3-dimethylacrolein to 3-methyl-3-buten-1-ol in the mixture to be separated can vary within wide limits. For example, mixtures in which the ratio of 3,3-dimethylacrolein to 3-methyl-3-buten-1-ol is between 1:10 and 10:1 can be readily separated. The process is particularly advantageous for the separation of mixtures in which the ratio of 3,3-dimethylacrolein to 3-methyl-3-buten-1-ol is from 1:8 to 2:1. In these mixtures, 2 to 15 percent of 3-methyl-3-buten-1-ol can be replaced by 3-methyl-2-buten-1-ol without significantly limiting the possibility of separating the components by distillation.

Separation of the mixture containing 3,3-dimethylacrolein and 3-methyl-3-buten-1-ol by distillation can be carried out batchwise or continuously. In the batch method, the azeotropes of both components are distilled off in succession. In the continuous method, the 3,3-dimethylacrolein is distilled off azeotropically and the 3-methyl-3-buten-1-ol/glycerol mixture is continuously withdrawn as a bottoms product and is worked up by distillation in a further distillation vessel, together with the bulk of the water.

5 to 30, preferably 8 to 20, parts by weight of glycerol are added per 100 parts by weight of the mixture of 3,3-dimethylacrolein and 3-methyl-3-buten-1-ol or the mixture of 3,3-dimethylacrolein, 3-methyl-3-buten-1-ol and 3-methyl-2-buten-1-ol in order to achieve the separating effect. In the batch method, the glycerol can either be introduced into the distillation vessel together with the mixture to be separated or added continuously at the top of the distillation vessel during the distillation, as in continuous operation.

The separation by distillation can be carried out at atmospheric pressure or subatmospheric pressure, i.e. at 50 to 500 mm Hg, preferably at 100 to 200 mm Hg.

The condensates of the azeotropic mixture obtained in the process according to the invention consist of two phases, namely an organic upper phase and an aqueous lower phase. The aqueous lower phase is generally recycled continuously to the distillation vessel.

The organic upper phase of the condensate of the 3,3-dimethylacrolein/water azeotrope consists essentially of 90 percent by weight of 3,3-dimethylacrolein and 8 to 9 percent by weight of water. The aqueous 90 percent dimethylacrolein can be dried with conventional agents, such as anhydrous sodium sulfate, or by removing water with an entrainer, for example pentane.

The organic upper phase of the condensate of the 3-methyl-3-buten-1-ol/water azeotrope consists of 82 percent by weight of 3-methyl-3-buten-1-ol, 16 percent by weight of water and approx. 1 to 2 percent by weight of 3,3-dimethylacrolein.

When the method according to the invention is used to separate a mixture which additionally contains 3-methyl-2-buten-1-ol, a condensate, the organic upper phase of which consists of about 82 percent by weight of a mixture of 3-methyl-3-buten-1-ol and 3-methyl-2-buten-1-ol, 16 percent by weight of water and approx. 1 to 2 percent by weight of 3,3-dimethylacrolein is obtained in addition to the condensate of the dimethylacrolein/water azeotrope. This mixture can either be separated by distillation after drying or can be used as it is.

3,3-Dimethylacrolein, which can be isolated in pure form by the process according to the invention, is a valuable intermediate for the synthesis of natural substances such as citral, vitamin A and chrysanthemic acid. For example, vitamin A-aldehyde can be prepared by reaction of β-ionylideneacetaldehyde with 3,3-dimethylacrolein and can be converted into vitamin A by reduction with aluminum isopropylate in isopropyl alcohol (cf. Berichte der deutschen chemischen Gesellschaft, 70, 857 (1937)).

The invention is further illustrated by the following Examples in which parts are by weight unless otherwise stated. Parts by volume bear the same relation to parts by weight as the liter to the kilogram.

EXAMPLE 1

A mixture obtained by dehydrogenation of a mixture of 800 parts of 3-methyl-3-buten-1-ol (boiling point 132°C) and 240 parts of water on a Cu-ZnO catalyst, and consisting of 127 parts of 3,3-dimethylacrolein (I), 652 parts of 3-methyl-3-buten-1-ol (II), 250 parts of water (corresponding to 32 parts by weight per 100 parts by weight of the mixture of I and II) and 11 parts of low-boiling constituents is fractionated batchwise after distilling off the low-boiling constituents at 100 mm Hg. During the distillation glycerol is continuously pumped in at the top of the column, the total amount added being 150 parts (corresponding to 19.3 parts of glycerol per 100 parts of the mixture of I and II). After condensation, the fractions obtained separate into an organic upper phase and an aqueous lower phase. The aqueous lower phase is returned to the distillation vessel. 135 parts of 90 percent aqueous 3,3-dimethylacrolein, which no longer contains any 3-methyl-3-buten-1-ol, is obtained. After drying over anhydrous sodium sulfate, 122 parts of pure 3,3-dimethylacrolein having a boiling point of 131°C at 760 mm Hg is obtained. The aqueous 3-methyl-3-buten-1-ol obtained, which still contains 2 parts of 3,3-dimethylacrolein, can be returned to the dehydrogenation stage.

EXAMPLE 2

A mixture obtained by dehydrogenation of 300 parts of 3-methyl-3-buten-1-ol and 48 parts of water on a Cu-ZnO catalyst, and consisting of 84 parts of 3,3-dimethylacrolein (I), 185 parts of 3-methyl-3-buten-1-ol (II), 55 parts of water (corresponding to 20.4 parts by weight per 100 parts by weight of the mixture of I and II) and 24 parts of low-boiling constituents is continuously fractionated in a column at 100 mm Hg after removal of the low-boiling constituents by simple distillation. During the fractional distillation, 120 parts per hour of the mixture is introduced at the middle of the fractionating column whilst 10 parts per hour of glycerol (corresponding to 10.1 parts per 100 parts of the mixture of I and II) is introduced at the top of the column. Using a reflux/discharge ratio of 3:1, the 3,3-dimethylacrolein/water azeotrope distils off overhead at 46°C. After condensation, the azeotrope separates into an organic upper phase and an aqueous lower phase. The aqueous lower phase is recycled to the lower part of the column. The organic upper phase no longer contains any 3-methyl-3-buten-1-ol. It consists of 90 percent by weight of 3,3-dimethylacrolein and 8.5 percent by weight of water. About 99 percent of the 3,3-dimethylacrolein is separated from the 3-methyl-3-buten-1-ol in this way.

The bulk of the water, the glycerol, 3-methyl-3-buten-1-ol and the residual 3,3-dimethylacrolein (about 1 percent by weight) are withdrawn from the bottom of the column. In a further column the 3-methyl-3-buten-1-ol/water azeotrope and the small amount of 3,3-dimethylacrolein are removed from the higher-boiling glycerol by distillation at 100 mm Hg.

EXAMPLE 3

A mixture of 430 parts of 3-methyl-3-buten-1-ol (II), 400 parts of 3,3-dimethylacrolein (I) and 170 parts of water (corresponding to 20.5 parts of water per 100 parts of the mixture of I and II) is fractionated continuously analogously to the procedure described in Example 2, except that 15 parts of glycerol is used instead of 10 parts of glycerol per 120 parts of the mixture (corresponding to 15.1 parts per 100 parts of the mixture of I and II). 98 to 99 percent of the 3,3-dimethylacrolein present in the mixture is separated from the 3-methyl-3-buten-1-ol.

EXAMPLE 4

A mixture of 400 parts of 3-methyl-3-buten-1-ol (II), 320 parts of 3,3-dimethylacrolein (I), 25 parts of 3-methyl-2-buten-1-ol (III) and 180 parts of water (corresponding to 24.2 parts of water per 100 parts of the mixture of I, II and III) is continuously fractionated analogously to the procedure described in Example 2, except that 14 parts of glycerol is used instead of 10 parts of glycerol per 120 parts of the mixture (corresponding to 14.6 parts per 100 parts of the mixture of I, II and III) and the 3-methyl-3-buten-1-ol/water azeotrope and the 3-methyl-3-buten-1-ol/water azeotrope are separated together from the higher-boiling glycerol by distillation at 100 mm Hg. 215 parts of pure 3,3-dimethylacrolein having a boiling point of 131°C at 760 mm Hg is isolated.

We claim:

1. A process for separating 3,3-dimethylacrolein from a mixture containing 3-methyl-3-buten-1-ol which comprises: heating said mixture in contact with water and in contact with glycerol whereby azeotropes of both 3,3-dimethylacrolein and 3-methyl-3-buten-1-ol are formed; said heating being continued at least until the said 3,3-dimethylacrolein is distilled off azeotropically with water and thereby separated from said 3-methyl-3-buten-1-ol, the amount of water present in the mixture being from 15 to 100 parts by weight per 100 parts of said mixture and the amount of glycerol present in said mixture being from 5 to 30 parts by weight per 100 parts of said mixture.

2. A process as set forth in claim 1 wherein the amount of water in said mixture is from 20 to 40 parts by weight per 100 parts of said mixture.

3. A process as set forth in claim 1 wherein the amount of glycerol present in said mixture is from 8 to 20 parts by weight per 100 parts of said mixture.

4. A process as set forth in claim 1 wherein said mixture consists essentially of 3,3-dimethylacrolein and 3-methyl-3-buten-1-ol.

5. A process as set forth in claim 1 wherein said mixture consists essentially of 3,3-dimethylacrolein, 3-methyl-3-buten-1-ol and 3-methyl-2-buten-1-ol.

6. A process as set forth in claim 4 wherein 3-methyl-3-buten-1-ol is distilled off azeotropically with water after said 3,3-dimethylacrolein has been distilled from said mixture.

7. A process as set forth in claim 5 wherein 3-methyl-3-buten-1-ol and 3-methyl-2-buten-1-ol is distilled off azeotropically with water after said 3,3-dimethylacrolein has been distilled from said mixture.

* * * * *